(12) United States Patent
Shachar et al.

(10) Patent No.: US 7,573,497 B2
(45) Date of Patent: Aug. 11, 2009

(54) COMPUTER-BASED MULTIMEDIA COMMUNICATION SYSTEM HAVING AN EXTERNAL UNIT

(76) Inventors: Yair Shachar, 3 Tsel Hagiva Street, Ramat Gan 52374 (IL); Yaron Menczel, 17 Snunit Street, Mevasseret Zion 90805 (IL); Einav Raizman-Kedar, 35a Gordon Street, Givataim 53235 (IL)

( * ) Notice: Subject to any disclaimer, the term of this patent is extended or adjusted under 35 U.S.C. 154(b) by 1064 days.

(21) Appl. No.: 10/727,054

(22) Filed: Dec. 4, 2003

(65) Prior Publication Data

US 2005/0005305 A1 Jan. 6, 2005

Related U.S. Application Data

(63) Continuation of application No. 09/504,947, filed on Feb. 16, 2000, now abandoned.

(51) Int. Cl.
*H04N 7/14* (2006.01)

(52) U.S. Cl. .................................. 348/14.01

(58) Field of Classification Search ............ 348/14.08, 348/14.01, 14.12
See application file for complete search history.

(56) References Cited

U.S. PATENT DOCUMENTS

| 5,802,281 A | * | 9/1998 | Clapp et al. ................. 709/228 |
| 7,075,564 B1 | * | 7/2006 | Jewell et al. ............. 348/14.08 |
| 2002/0051069 A1 | * | 5/2002 | Inagaki ..................... 348/14.03 |

* cited by examiner

*Primary Examiner*—Stella L Woo (57) ABSTRACT

A multimedia communication system includes a host computer having an external bus and a unit external to the host computer. The unit is connected to the host computer via the external bus. The unit is configured to capture a video stream from a video input device, to convert the captured video stream according to a predetermined standard for transmitting video over a network, and to send the converted video stream to the host computer via the external bus. The system also includes a software video decoder installed on the host computer.

32 Claims, 4 Drawing Sheets

COMPUTER-BASED MULTIMEDIA COMMUNICATION SYSTEM HAVING AN EXTERNAL UNIT

CROSS REFERENCE TO RELATED APPLICATIONS

This application is a continuation of U.S. patent application Ser. No. 09/504,947, filed Feb. 16, 2000 now abandoned.

FIELD OF THE INVENTION

The present invention relates to video conferencing, in general, and to computer-based video conferencing, in particular.

BACKGROUND OF THE INVENTION

Business-quality video conferencing systems are currently implemented either as a standalone appliance or integrated into a host unit. The standalone appliance implementation, for example a set-top box, can be connected to a television set, but its functionality is in general limited to sending video and audio and receiving video and audio. In contrast, a video conferencing system integrated into a computer has access to other applications running on the computer and therefore has the potential for incorporating data from those applications into the video and audio stream, thereby combining video conferencing with application sharing.

Computer-based video conferencing systems that are implemented solely in software are commercially available, for example, "CU-SeeMe" from White Pine Software Inc. of Nashua, N.H., USA. Such software-only systems rely on the computer's standard video card to interface to the video camera ("video grabbing") and computer monitor, and do all of the video encoding and decoding on the host computer's central processing unit (CPU), thus resulting in a less than business quality of video conferencing.

Business quality computer-based video conferencing systems are currently implemented by an add-on card that is inserted into an empty slot in the internal input/output bus of the computer (for example, a PCI card in the case of an Intel-based computer). The video camera and microphone are connected to the add-on card, which has dedicated hardware for video grabbing, dedicated hardware for video and audio encoding and decoding, and dedicated hardware for multiplexing of the video and audio streams. The system also includes at least one installable software application for coordinating a video conference. Such systems include "Cruiser 150" from VCON Ltd. of Herzliya, Israel and "OnWAN340" from Zydacron Inc. of Manchester, N.H., USA.

One of the disadvantages of such a system is that the installation of the add-on card is a cumbersome and daunting task, requiring one to open the personal computer or workstation. Another disadvantage is that there is no support for laptops. Yet another disadvantage is that all of the video processing is done on the card and none on the computer's CPU, resulting in a load imbalance due to not fully utilizing the processing power of the CPU. A further disadvantage is that there may be a conflict with other cards that are installed on the computer's internal bus due to overlapping in resource definitions.

It would therefore be beneficial to have a multimedia communication system that is easily installable and enables application sharing with a host such as a personal computer, workstation or laptop. It would also be beneficial for the system to provide business quality video conferencing while exploiting the processing power of the host's CPU.

Universal Serial Bus (USB) cameras connected to personal computers are commercially available. "USBvision II NT1004" from Nogatech Ltd. of Kfar Saba, Israel is a commercially available chipset for compressing video grabbed by a USB camera for locally viewing the video on the personal computer. However, the compression performed by "USBvision II NT1004" or an equivalent product is unsuitable for transferring the video over bandwidth limited communication media such as IP networks and ISDN lines. A video conferencing system based on such a product would have to decompress the video at the host computer and compress it again using a standard multimedia communication format such as MPEG4, ITU H.263 or ITU G.723 before transferring the video to a remote computer. This decompression and recompression at the host computer would generate additional computational load and would degrade the quality of the perceived video at the remote computer.

SUMMARY OF THE INVENTION

There is provided in accordance with a preferred embodiment of the present invention a multimedia communication system including a host computer having an external bus and a unit external to the host computer and connected to the host computer via the external bus. The unit is configured to capture a video stream from a video input device, to convert the captured video stream according to a predetermined standard for transmitting video over a network, and to send the converted video stream to the host computer via the external bus.

Moreover, in accordance with a preferred embodiment of the present invention, the system further includes a video output device connected to the host computer; and a software video decoder installed on the host computer. The software video decoder is configured to decode the converted video stream for display by the video output device.

Furthermore, in accordance with a preferred embodiment of the present invention, the host computer is connected to the network and is configured to receive via the network at least one encoded video stream. In this embodiment, the system further includes a video output device connected to the host computer, and a software video decoder installed on the host computer. The software video decoder is configured to decode at least one of the at least one encoded video stream for display by the video output device.

Moreover, in accordance with a preferred embodiment of the present invention, the host computer has an application installed thereon, the application having data associated therewith, and the system further includes a software multiplexer installed on the host computer for multiplexing the converted video stream with the data.

Preferably, the host computer is a personal computer, a laptop, a network computer or a workstation.

Preferably, the external bus is Universal Serial Bus, IEEE 1394 Bus, an infrared wireless connection or a radio frequency wireless connection.

Preferably, the standard is ITU H.263, ITU H.261, MPEG4, MPEG2 or MPEG1.

Preferably, the network is an Internet Protocol (IP) network, an Ethernet networks or an ISDN line.

There is also provided in accordance with a preferred embodiment of the present invention a multimedia communication system for a host computer having an external bus and connected to a video output device. The system includes a unit external to the host computer and connected to the host computer via the external bus and a software video decoder installed on the host computer. The unit is configured to capture a video stream from a video input device, to convert the captured video stream according to a predetermined standard for transmitting video over a network, and to send the converted video stream to the host computer via the external bus. The software video decoder is configured to decode the converted video stream for display by the video output device.

There is also provided in accordance with a preferred embodiment of the present invention a multimedia communication system for a host computer having an external bus and connected to a video output device. The host computer is connected to a network and is configured to receive via the network at least one encoded video stream. The system includes a unit external to the host computer and connected to the host computer via the external bus, and a software video decoder installed on the host computer. The unit is configured to capture a raw video stream from a video input device, to convert the captured video stream according to a predetermined standard for transmitting video over a network, and to send the converted video stream to the host computer via the external bus. The software video decoder is configured to decode at least one of the at least one encoded video stream for display by the video output device.

There is also provided in accordance with a preferred embodiment of the present invention a multimedia communication system for a host computer having an external bus and connected to a video output device. The host computer is connected to a network and is configured to receive via the network at least one encoded video stream. The system includes a unit external to the host computer and connected to the host computer via the external bus, a first software video decoder and a second software video decoder. The unit is configured to capture a video stream from a video input device, to convert the captured video stream according to a predetermined standard for transmitting video over a network, and to send the converted video stream to the host computer via the external bus. The unit is also configured to compress the captured video stream, and to send the compressed video stream to the host computer via the external bus. The first software video decoder is installed on the host computer and is configured to decode at least one of the at least one encoded video stream for display by the video output device. The second software video decoder is installed on the host computer and is configured to decompress the compressed video stream for display by the video output device.

There is also provided in accordance with a preferred embodiment of the present invention a multimedia communication system for a host computer having an application installed thereon, the application having data associated therewith, the host computer having an external bus. The system includes a unit external to the host computer and connected to the host computer via the external bus and a software multiplexer. The unit is configured to capture a video stream from a video input device, to convert the captured video stream according to a predetermined standard for transmitting video over a network, and to send the converted video stream to the host computer via the external bus. The software multiplexer is installed on the host computer and multiplexes the converted video stream with the data.

There is provided in accordance with a preferred embodiment of the present invention a method for multimedia communication. The method includes the steps of capturing a video stream from a video input device and converting the video stream according to a predetermined standard for transmitting video over a network. The method also includes the step of sending the converted video stream to a host computer via an external bus of the host computer.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

The present invention is directed to a multimedia communication system where audio, video and data streams are compressed in order to transmit and receive such streams over a bandwidth-limited communication medium such as Internet Protocol (IP) networks, Ethernet networks and ISDN lines. In the present invention, the system includes an external unit connected to a host computer via a bus. The external unit comprises dedicated hardware for video grabbing and video encoding, while application software installed on the host computer enables video decoding to be performed on the host computer's central processing unit (CPU).

This configuration of an external unit and a host computer has a number of advantages over the prior art. Firstly, it is user-friendly, as there is no add-on card to be installed in the host computer. Rather, the external unit is easily connected to the host computer's bus with a suitable cable. Secondly, the separation of software and hardware enables user sharing. Since the dedicated hardware is in an external unit and not in the host computer, the external unit can be connected to any host computer having the application software installed thereon. Thirdly, since some of the processing is done on the external unit, and some of the processing is done on the host computer's CPU, the load balance is more equitable and takes advantage of the CPU's processing power. Finally, since the external unit is "non-invasive" and connected to the host only via a serial link, the potential for malfunctioning due to resource definition collisions is nullified.

Figure 1:
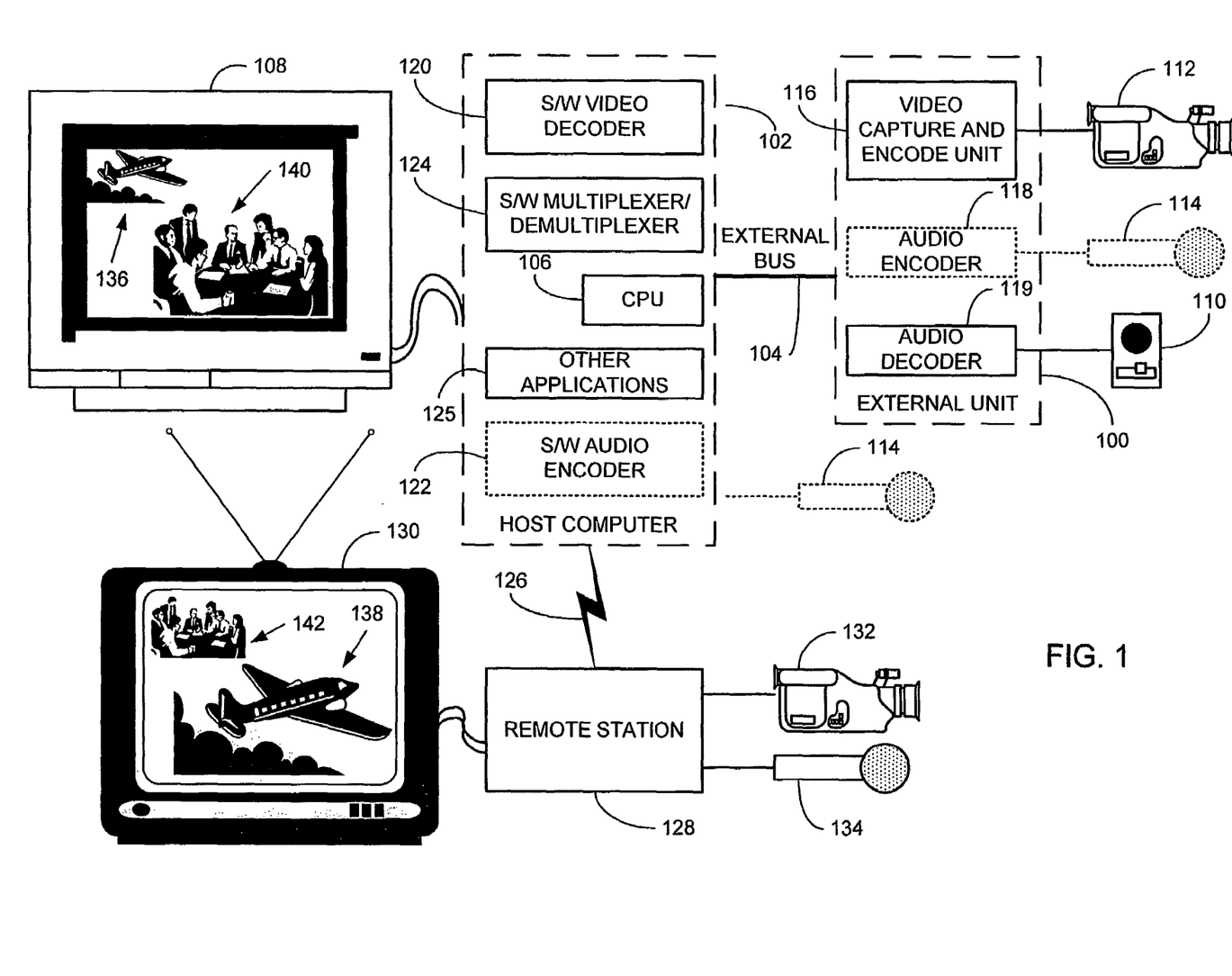
FIG. 1 is a schematic illustration of a multimedia communication system, according to a preferred embodiment of the present invention.

Reference is now made to FIG. 1, which is a schematic illustration of a multimedia communication system, according to a preferred embodiment of the present invention. The system comprises an external unit 100, which is connected to a host 102 by an external bus 104. Non-limiting examples of host 102 include a personal computer, a workstation, a laptop, and any other suitable machine having a central processing unit (CPU) 106. Non-limiting examples of bus 104 include Universal Serial Bus (USB), IEEE 1394 Bus and an infrared (IR) or radio frequency (RF) wireless connection. Host 102 is connected to or contains a video output device 108 such as a computer monitor, a television screen or a projector.

External unit 100 is connected to at least one video input device 112 such as, but not limited to, a video camera, and at least one audio input device 114, such as, but not limited to, a microphone. External unit 100 is also connected to an audio output device 110 such as speakers or a headset. External unit 100 includes a video capture and encode unit 116, which is dedicated hardware for video grabbing and video encoding.

External unit 100 also includes an audio encoder 118, which is dedicated hardware for audio grabbing and audio encoding. External unit 100 also includes an audio decoder 119, which is connected to audio output device 110. A software video decoder 120 is installed on host 102 to enable video decoding on CPU 106. A software multiplexer/demultiplexer 124 is installed on host 102 to enable multiplexing of video, audio and data to be performed on CPU 106, the data being produced by other applications 125, and to enable demultiplexing of mutliplexed streams received from remote locations.

Host 102 is connected via a communication network 126 to a remote station 128, which is connected to a video output device and an audio output device. In the example shown in FIG. 1, these devices are combined in a television 130. Remote station 128 is also connected to a video input device 132 such as a video camera and an audio input device 134 such as a microphone. Communication network 126 is a bandwidth-limited communication medium such as Internet Protocol (IP) networks, Ethernet networks, and ISDN lines.

Video input device 112 grabs a visual image of a scene, which is captured and encoded by video capture and encode unit 116, transmitted along bus 104 to host 102, and from host 102 via communication network 126 to remote station 128, where it is decoded and displayed as a remote scenario 138 in television 130. Video input device 132 grabs a different scene, which is transmitted in encoded format via communication network 126 to host 102, where it is decoded by software video decoder 120 and displayed as a remote scenario 140 in video output device 108. Similar encoding, transmission and decoding are performed for sounds grabbed by audio input device 114.

The multimedia communication system is capable of displaying a picture within a picture (PIP) so that a local scenario and a remote scenario can be viewed simultaneously. The scene grabbed by video input device 112 is received in encoded format at host 102 from bus 104, decoded by software video decoder 120 and displayed as a local scenario 136 in video output device 108. Similarly, the scene grabbed by video input device 132 is displayed as a local scenario 142 in television 130.

It will be appreciated by persons skilled in the art that there may be a plurality of remote stations to which the multiplexed local multimedia stream is sent via communication network 126, and similarly, host computer 102 may receive multiplexed remote multimedia streams via communication network 126 from a plurality of remote stations. In this case, video output device 108 may display all of the remote scenarios or only selected one or ones.

According to an alternate preferred embodiment of the present invention, audio input device 114 is not connected to external unit 100, but rather to host 102. In this embodiment, external unit does not comprise audio encoder 118; rather the standard sound card of host 102 interfaces to audio input device 114, and the audio encoding is performed by a software audio encoder 122 running on CPU 106.

Figure 2:
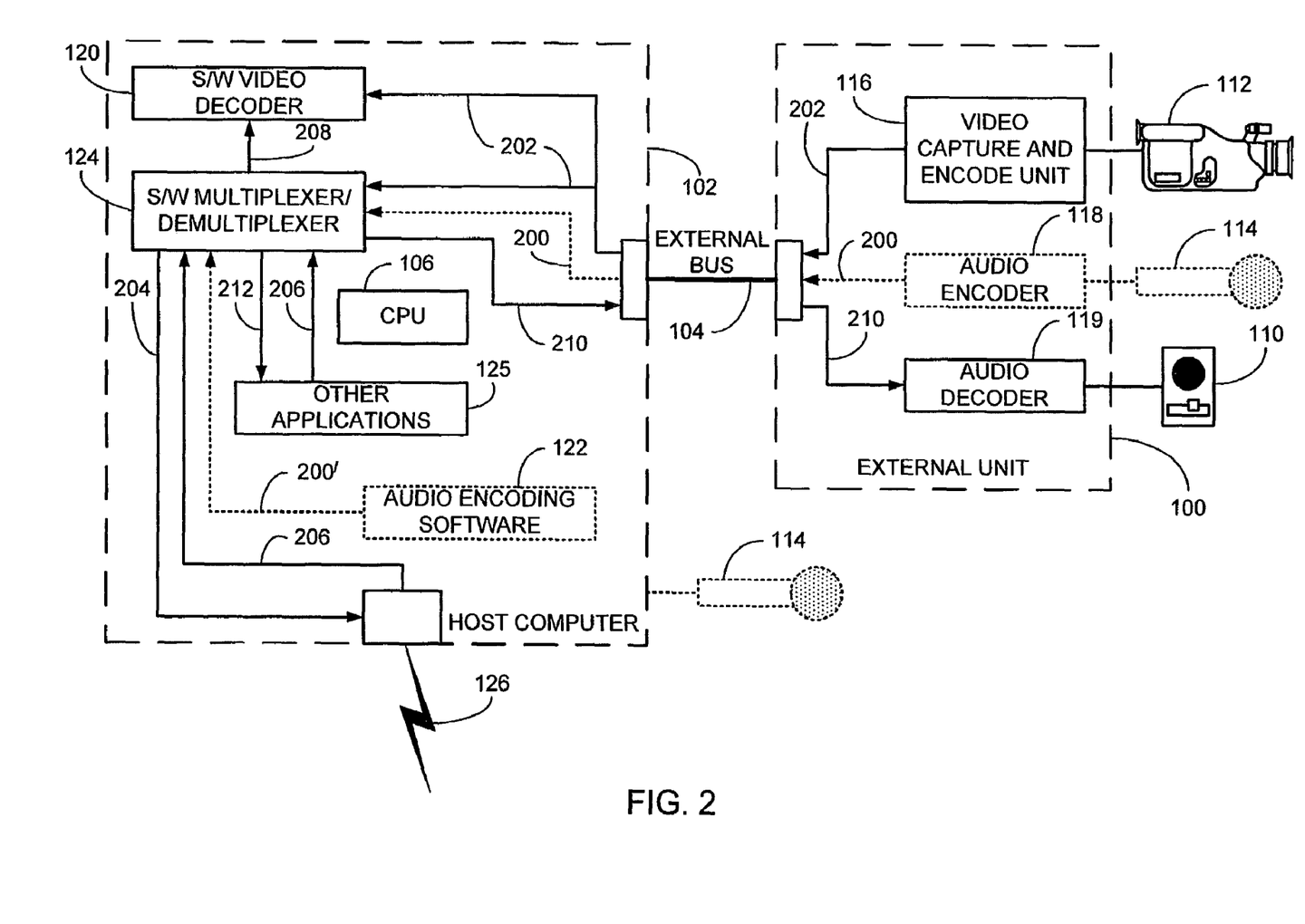
FIG. 2 is a schematic illustration of an external unit and host, configured and operative according to a preferred embodiment of the present invention.

Reference is now made to FIG. 2, which is a schematic block diagram of external unit 100 and host 102, configured and operative in accordance with a preferred embodiment of the present invention. FIG. 2 shows the flow of local audio and video streams and remote audio and video streams. Audio encoder 118 converts the audio grabbed by audio input device 114 into a local compressed audio stream 200, for example according to the International Telecommunication Union (ITU) G.723 standard. Similarly, video capture and encode unit 116 converts the video grabbed by video input device 112 into a local compressed video stream 202, for example according to the ITU H.263 standard or any other suitable standard such as ITU H.261, MPEG4, MPEG2 or MPEG1. According to the present invention, local compressed audio stream 200 and local compressed video stream 202 are compatible with audio and video standards, respectively, for communication over bandwidth-limited communication media such as Internet Protocol (IP) networks, Ethernet networks and ISDN lines. Therefore streams 200 and 202 are therefore suitable for transferring over communication network 126 without decompressing and recompressing at host 102.

Local compressed audio stream 200 and local compressed video stream 202 are sent via external bus 104 to host 102, where they are multiplexed by software multiplexer/demultiplexer 124 into a local multiplexed stream 204, for example according to the ITU H.323 standard, suitable for communication over bandwidth-limited communication media such as Internet Protocol (IP) networks, Ethernet networks and ISDN lines. Software multiplexer/demultiplexer 124 is also capable of receiving data 206 produced by other applications 125 and multiplexing it into local multiplexed stream 204. Local multiplexed stream 204 is sent via communication network 126 to a remote location.

The multimedia communication system is capable of displaying a picture within a picture (PIP) so that a local scenario and a remote scenario can be viewed simultaneously. Therefore, local compressed video stream 202 is also sent to software video decoder 120, where it is decoded for display as a local scenario 136 in video output device 108 (FIG. 1).

In the other direction, a remote station transmits a remote multiplexed stream 206 via communication network 126 to host 102, where it is demultiplexed by software multiplexer/demultiplexer 124 into remote compressed video stream 208, remote compressed audio stream 210 and possibly data 212 as well. Data 212 is sent to other applications 125. Remote compressed video stream 208 is sent to software video decoder 120, where it is decoded for display as a remote scenario 140 in video output device 108. Remote compressed audio stream 210 is sent to external unit 100 via external bus 104, where it is decoded by audio decoder 119 and played in audio output device 110.

According to an alternate preferred embodiment of the present invention, audio input device 114 is not connected to external unit 100, but rather to host 102. The standard sound card of host 102 interfaces to audio input device 114, and software audio encoder 122 converts the audio grabbed by audio input device 114 into a local compressed audio stream 200, for example according to the International Telecommunication Union. (ITU) G.723 standard. Local compressed audio stream 200 is provided to software multiplexer/demultiplexer 124 for multiplexing with local compressed video stream 202 and possibly with data 206 as well.

Figure 3A:
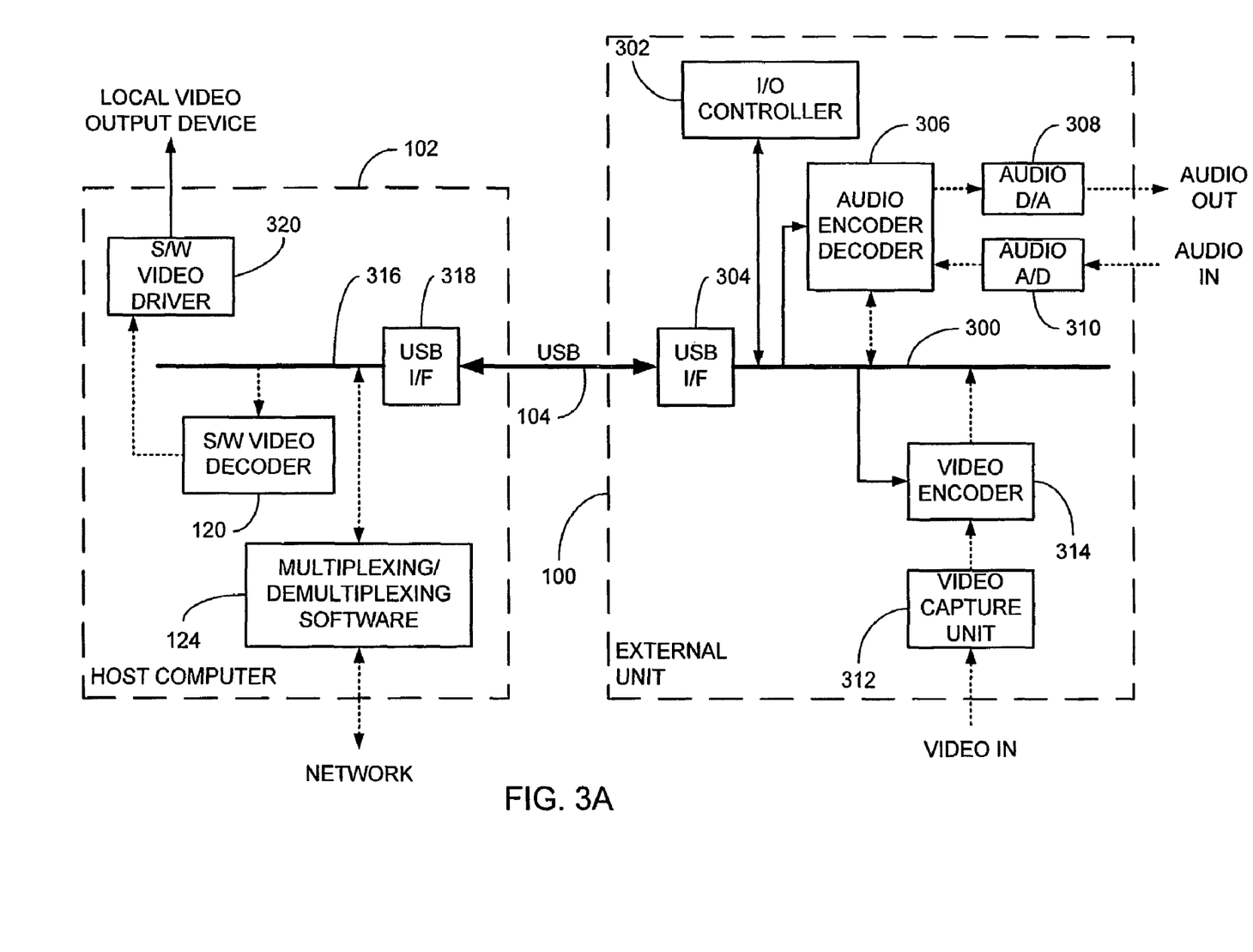
FIGS. 3A and 3B are schematic illustrations of an external unit and host, configured and operative according to two preferred embodiments of the present invention.
Figure 3B:
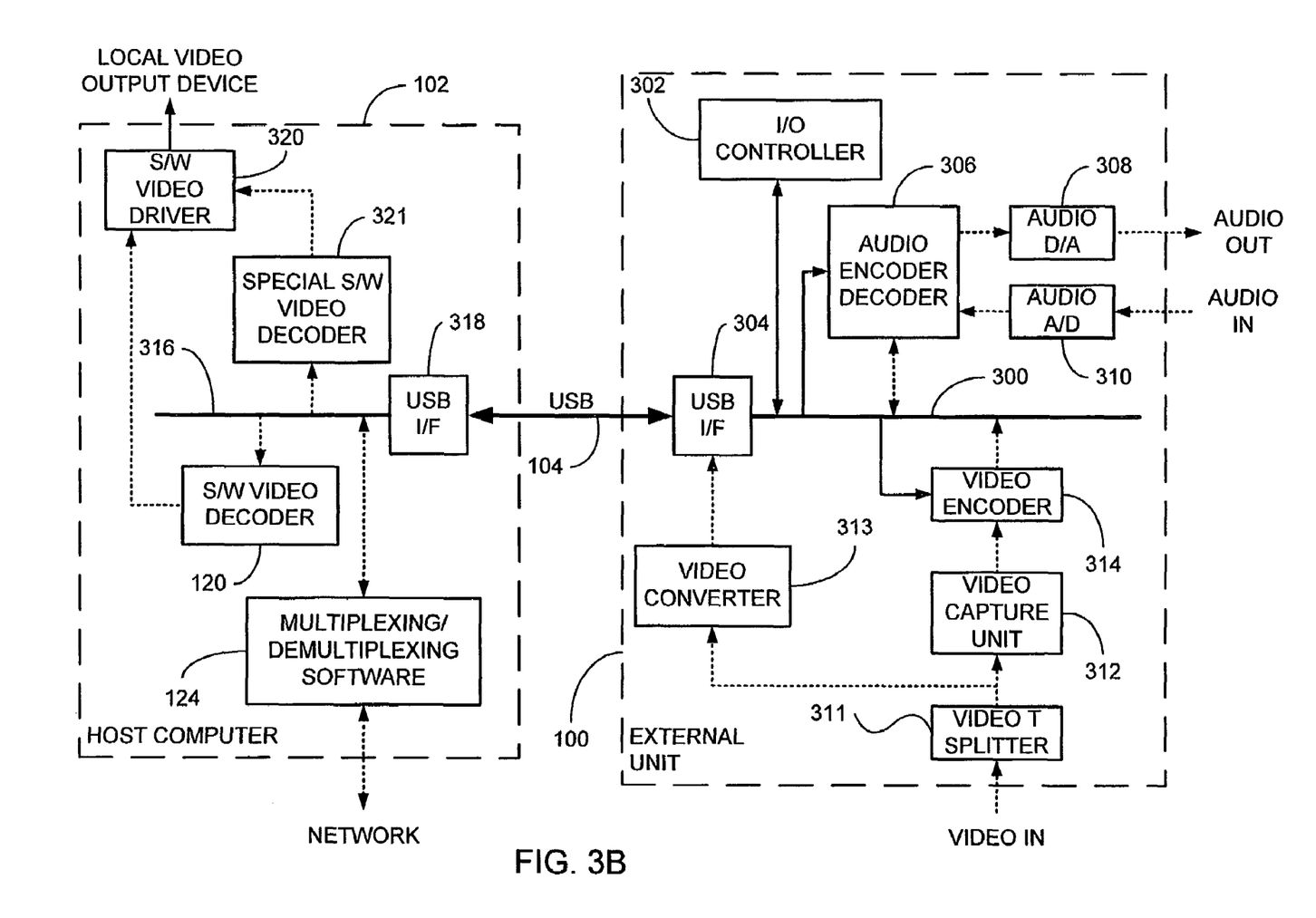

Reference is now made to FIGS. 3A and 3B, which are schematic illustrations of external unit 100 and host computer 102, connected via external bus 104, configured and operative in accordance with two preferred embodiments of the present invention. In these embodiments, the external bus is a USB 104. In these figures, data flow is indicated with a dotted line, while control flow is indicated with a solid line.

In FIG. 3A, external unit 100 comprises an internal bus 300 and an input/output (I/O) controller 302 connected to internal bus 300. I/O controller 302 receives and transmits control signals from and to internal bus 300, the control signals controlling other units connected to internal bus 300. External unit 100 also comprises a USB interface (I/F) 304 connected to USB 104 and internal bus 300. USB interface 304 is used to convert audio and video streams to and from USB format.

External unit 100 also comprises an audio encoder/decoder 306, and an audio digital-to-analog (D/A) converter 308 and an audio analog-to-digital (A/D) converter 310, both connected to audio encoder/decoder 306. Audio A/D converter 310 receives audio signals from an audio input device (not shown) and converts them into an audio stream, which is transferred to audio encoder/decoder 306. Audio encoder/decoder 306 receives an audio the audio stream from audio A/D converter 310 and transfers the audio stream to internal bus 300. In the other direction, audio encoder/decoder 306 receives an audio stream from internal bus 300 and transfers it to audio D/A converter 308, which converts it into analog audio signals, which are then transferred to an audio output device (not shown). Audio encoder/decoder 306 also receives control signals from internal bus 300.

External unit 100 also includes video capture unit 312 and video encoder 314. Video capture unit 312 receives video signals from a video input device (not shown) and converts them into a video stream, which is transferred to video encoder 314. Video encoder 314 receives the video stream from video capture unit 312 and transfers the video stream to internal bus 300. Video encoder 314 also receives control signals from internal bus 300.

Host computer 102 comprises an internal bus 316 and a USB interface 318 connected to USB 104 and internal bus 316. USB interface 318 is used to convert audio and video streams to and from USB format. Host 102 also comprises software video decoder 120, software multiplexer/demultiplexer 124 and software video driver 320, all of which are connected to internal bus 316.

When software multiplexer/demultiplexer 124 receives a multiplexed stream from a network, it demultiplexes the stream into a video stream and an audio stream, both of which are transferred to internal bus 316. Internal bus 316 then transfers the audio stream to USB interface 318 for transmission to external unit 100, and transfers the video stream to software video decoder 120. Software video decoder 120 decodes the video stream and transfers the decoded video stream to software video driver 320 for display by a local video output device.

In the other direction, internal bus 316 transfers the video stream received from USB interface 318 to video software decoder 120. Internal bus 316 also transfers the video and audio streams received from USB 318 to software multiplexer/demultiplexer 124 for multiplexing into a multiplexed stream which is subsequently sent to the network.

In the embodiment shown in FIG. 3A, both the local scenario and the remote scenario are decoded by software video decoder 120 prior to being sent to software video driver 320 for display by a local video output device.

The embodiment shown in FIG. 3B differs from that shown in FIG. 3A in that the external unit 100 splits the local video into two portions, one portion captured and encoded according to a standard for transmitting video over a network, for example, the ITU H.263 standard or any other suitable standard such as ITU H.261, MPEG4, MPEG2 or MPEG1, and the other portion captured and encoded in a non-standard manner for local viewing in a video output device connected to host 102.

In FIG. 3B, external unit 100 comprises all of the elements shown for external unit 100 in FIG. 3A, and further comprises a video T splitter 311 and a video converter 313. Host 102 comprises all of the elements shown for host 102 in FIG. 3A, and further comprises a special software video decoder 321 connected to internal bus 316 and software video driver 120. Video T splitter 311 receives video signals from a video input device (not shown) and splits them into two video connections. One video connection is sent to video capture unit 312, which operates as described hereinabove with respect to FIG. 3A. The other video connection is sent to video converter 313, which compresses the received video signal in a non-standard manner, so that the resulting compressed video stream can be transferred over USB 104 but is unsuitable for transfer over a network. An example of video converter 313 is the chipset of "USBvision II NT1004" from Nogatech Ltd. Video converter 313 transfers the compressed video stream to USB interface 304, which transfers it to host 102.

When USB interface 318 receives the compressed video stream, it transfers it to special software video decoder 321 via internal bus 316. Special software video decoder 321, for example the "USBvision II NT1004 Software Driver" from Nogatech Ltd, decompresses the compressed video stream so that software video driver 320 can display the local scenario on a local video output device.

It will be appreciated by persons skilled in the art that the present invention is not limited by what has been particularly shown and described herein above. Rather the scope of the invention is defined by the claims that follow:

What is claimed is:

1. A multimedia communication system comprising:
   a host computer; and
   a unit external to said host computer and connected to said host computer via an external bus, said unit configured to capture a video stream from a video input device, to convert said captured video stream according to a predetermined standard for transmitting video over a network, and to send said converted video stream to said host computer via said external bus,
   wherein said host computer is configured to display content of said converted video stream on a local video output device and substantially concurrently to send said content of said converted video stream for a remote display.

2. A system according to claim 1, the system further comprising:
   a video output device connected to said host computer; and
   a software video decoder installed on said host computer, said software video decoder configured to decode said converted video stream for display by said video output device.

3. A system according to claim 1, wherein said host computer is connected to said network and is configured to receive via said network at least one encoded video stream, the system further comprising:
   a video output device connected to said host computer; and
   a software video decoder installed on said host computer, said software video decoder configured to decode at least one of said at least one encoded video stream for display by said video output device.

4. A system according to claim 1, wherein said host computer has an application installed thereon, said application having data associated therewith, the system further comprising:
   a software multiplexer installed on said host computer for multiplexing said converted video stream with said data.

5. A system according to claim 1, wherein said host computer is selected from a group including: a personal computer, a laptop, a network computer, a personal digital assistant (PDA), and a workstation.

6. A system according to claim 1, wherein said external bus is selected from a group including: Universal Serial Bus, IEEE 1394 Bus, an infrared wireless connection and a radio frequency wireless connection.

7. A system according to claim 1, wherein said standard is selected from a group including: ITU H.264, ITU H.263, ITU H.261, MPEG4, MPEG2 and MPEG1.

8. A system according to claim 1, wherein said network is selected from a group including: an Internet Protocol (IP) network, an Ethernet networks and an ISDN line.

9. A multimedia communication system for a host computer having an external bus and connected to a video output device, the system comprising:
   a unit external to said host computer and connected to said host computer via said external bus, said unit configured to capture a video stream from a video input device, to convert said captured video stream according to a predetermined standard for transmitting video over a network, and to send said converted video stream to said host computer via said external bus;
   a software video decoder installed on said host computer, said software video decoder configured to decode said converted video stream for display by said video output device; and
   wherein said host computer is configured to display content of said converted video stream on a local video output device and substantially concurrently to send said content of said converted video steam for remote display.

10. A system according to claim 9, wherein said host computer is selected from a group including: a personal computer, a laptop, a network computer, a personal digital assistant (PDA) and a workstation.

11. A system according to claim 9, wherein said external bus is selected from a group including: Universal Serial Bus, an Ethernet network, IEEE 1394 Bus, an infrared wireless connection and a radio frequency wireless connection.

12. A system according to claim 9, wherein said standard is selected from a group including: ITU H.264, ITU H.263, ITU H.261, MPEG4, MPEG2 and MPEG1.

13. A system according to claim 9, wherein said network is selected from a group including: an Internet Protocol (IP) network, an Ethernet networks and an ISDN line.

14. A multimedia communication system for a host computer having an external bus and connected to a video output device, said host computer connected to a network and configured to receive via said network at least one encoded video stream, the system comprising:
   a unit external to said host computer and connected to said host computer via said external bus, said unit configured to capture a raw video stream from a video input device, to convert said captured video stream according to a predetermined standard for transmitting video over a network, and to send said converted video stream to said host computer via said external bus;
   a software video decoder installed on said host computer, said software video decoder configured to decode at least one of said at least one encoded video stream for display by said video output device; and
   wherein said host computer is configured to display content of said converted video stream on a local video output device and substantially concurrently to send said content of said converted video steam for remote display.

15. A system according to claim 14, wherein said host computer is selected from a group including: a personal computer, a laptop, a network computer, a personal digital assistant (PDA) and a workstation.

16. A system according to claim 14, wherein said external bus is selected from a group including: Universal Serial Bus, an Ethernet network, IEEE 1394 Bus, an infrared wireless connection and a radio frequency wireless connection.

17. A system according to claim 14, wherein said standard is selected from a group including: ITU H.264, ITU H.263, ITU H.261, MPEG4, MPEG2 and MPEG1.

18. A system according to claim 14, wherein said network is selected from a group including: an Internet Protocol (IP) network, an Ethernet networks and an ISDN line.

19. A system according to claim 18, wherein said host computer contains a bandwidth rate control mechanism, which mechanism reduces the bandwidth of said transmitted encoded video stream over the said network.

20. A multimedia communication system for a host computer having an external bus and connected to a video output device, said host computer connected to a network and configured to receive via said network at least one encoded video stream, the system comprising:
   a unit external to said host computer and connected to said host computer via said external bus, said unit configured to capture a video stream from a video input device, to convert said captured video stream according to a predetermined standard for transmitting video over a network, and to send said converted video stream to said host computer via said external bus, said unit also configured to compress said captured video stream, and to send said compressed video stream to said host computer via said external bus;
   a first software video decoder installed on said host computer, said first software video decoder configured to decode at least one of said at least one encoded video stream for display by said video output device;
   a second software video decoder installed on said host computer, said second software video decoder configured to decompress said compressed video stream for display by said video output device; and
   wherein said host computer is configured to display content of said converted video stream on a local video output device and substantially concurrently to send said content of said converted video stream for remote display.

21. A system according to claim 20, wherein said host computer is selected from a group including: a personal computer, a laptop, a network computer, a personal digital assistant (PDA) and a workstation.

22. A system according to claim 20, wherein said external bus is selected from a group including: Universal Serial Bus, an Ethernet network, IEEE 1394 Bus, an infrared wireless connection and a radio frequency wireless connection.

23. A system according to claim 20, wherein said standard is selected from a group including: ITU H.264, ITU H.263, ITU H.261, MPEG4, MPEG2 and MPEG1.

24. A system according to claim 20, wherein said network is selected from a group including: an Internet Protocol (IP) network, an Ethernet networks and an ISDN line.

25. A multimedia communication system for a host computer having an application installed thereon, said application having data associated therewith, said host computer having an external bus, the system comprising:
   a unit external to said host computer and connected to said host computer via said external bus, said unit configured to capture a video stream from a video input device, to convert said captured video stream according to a predetermined standard for transmitting video over a network, and to send said converted video stream to said host computer via said external bus;
   a software multiplexer installed on said host computer for multiplexing said converted video stream with said data; and wherein said host computer is configured to display content of said converted video stream on a local video output device and substantially concurrently to send said content of said converted video steam for remote display.

26. A system according to claim 25, wherein said host computer is selected from a group including: a personal computer, a laptop, a network computer, a personal digital assistant (PDA) and a workstation.

27. A system according to claim 25, wherein said external bus is selected from a group including: Universal Serial Bus, an Ethernet network, IEEE 1394 Bus, an infrared wireless connection and a radio frequency wireless connection.

28. A system according to claim 25, wherein said standard is selected from a group including: ITU H.264, ITU H.263, ITU H.261, MPEG4, MPEG2 and MPEG1.

29. A system according to claim 25, wherein said network is selected from a group including: an Internet Protocol (IP) network, an Ethernet networks and an ISDN line.

30. A method for multimedia communication, the method comprising the steps of:
- capturing a video stream from a video input device;
- converting said video stream according to a predetermined standard for transmitting video over a network;
- sending said converted video stream to a host computer via an external bus of said host computer;
- decoding said converted video stream in said host computer;
- displaying content of said decoded video stream on a local output video device;
- sending said converted video stream to a remote terminal over a network; and
- wherein displaying content of said converted video stream on a local video output device and sending said content of said converted video stream for a remote display is performed substantially concurrently.

31. A multimedia communication system comprising:
a host computer;
a unit external to said host computer and connected to said host computer via an external bus, said unit configured to capture a video stream from a video input device, to convert said captured video stream according to a predetermined standard for transmitting video over a network, and to send said converted video stream to said host computer via said external bus,
wherein said host computer further comprises a decoder configured to decode said converted video stream for display by a local video output device and to concurrently decode a second coded video stream received from a remote video source for display by said local video output device; and
wherein said host computer is configured to display content of said converted video stream on a local video output device and substantially concurrently to send said content of said converted video steam for remote display.

32. A multimedia communication system comprising:
a host computer;
a unit external to said host computer and connected to said host computer via an external bus, said unit configured to capture a video stream from a video input device, to convert said captured video stream according to a predetermined standard for transmitting video over a network, and to send said converted video stream to said host computer via said external bus,
wherein said unit is configured to capture an audio stream from a local audio input device, and to send said audio stream to said host computer via said external bus, said host computer further comprises a decoder configured to decode a converted audio stream from a remote audio coded source for play by a local audio output device and to concurrently play said audio stream from said local audio input device by said local audio output device; and
wherein said host computer is configured to display content of said converted video stream on a local video output device and substantially concurrently to send said content of said converted video steam for remote display.

* * * * *